United States Patent
Bansemir et al.

[11] Patent Number: 5,618,076
[45] Date of Patent: Apr. 8, 1997

[54] RAIL WHEEL

[75] Inventors: Horst Bansemir, Munich; Bernd Bongers, Kirchheim; Hermann Eschbaumer, Grosskarolinenfeld, all of Germany

[73] Assignee: Eurocopter Deutschland GmbH, Munich, Germany

[21] Appl. No.: 423,509

[22] Filed: Apr. 17, 1995

[30] Foreign Application Priority Data

Apr. 16, 1994 [DE] Germany .......................... 44 13 308.1

[51] Int. Cl.$^6$ .................................................. B60B 19/00
[52] U.S. Cl. .................................................. 295/21; 295/23
[58] Field of Search .................................. 295/1, 7, 8, 11, 295/15, 16, 17, 20, 21, 23, 30

[56] References Cited

U.S. PATENT DOCUMENTS

| 4,863,207 | 9/1989 | Wackerle | 295/21 |
| 4,982,990 | 1/1991 | Bongers et al. | 295/23 X |

FOREIGN PATENT DOCUMENTS

| 570434 | 1/1933 | Germany | 295/11 |
| 3143845 | 5/1983 | Germany . | |
| 3328321 | 2/1985 | Germany . | |
| 3814344 | 11/1989 | Germany | 295/8 |
| 3108 | of 1869 | United Kingdom | 295/21 |

OTHER PUBLICATIONS

Das SAB V–Rad Für Schienenfahrzeuge, Sep. 15, 1995.

Primary Examiner—Russell D. Stormer
Attorney, Agent, or Firm—Evenson, McKeown, Edwards & Lenahan, P.L.L.C.

[57] ABSTRACT

In the case of a rail wheel having a wheel disk made of plastic and a tire made of metal, these are connected with one another by way of a metallic intermediate ring onto which the tire is shrunk. In this case, the wheel disk has a conical cross-sectional profile on its circumference and the intermediate ring, which is form-locking therewith, is axially divided into two partial rings with a correspondingly partially conical interior surface. The partial rings are in a mutual force-locking connection and are glued to the wheel disk. This ensures a double safety connection between the intermediate ring and the wheel disk.

12 Claims, 1 Drawing Sheet

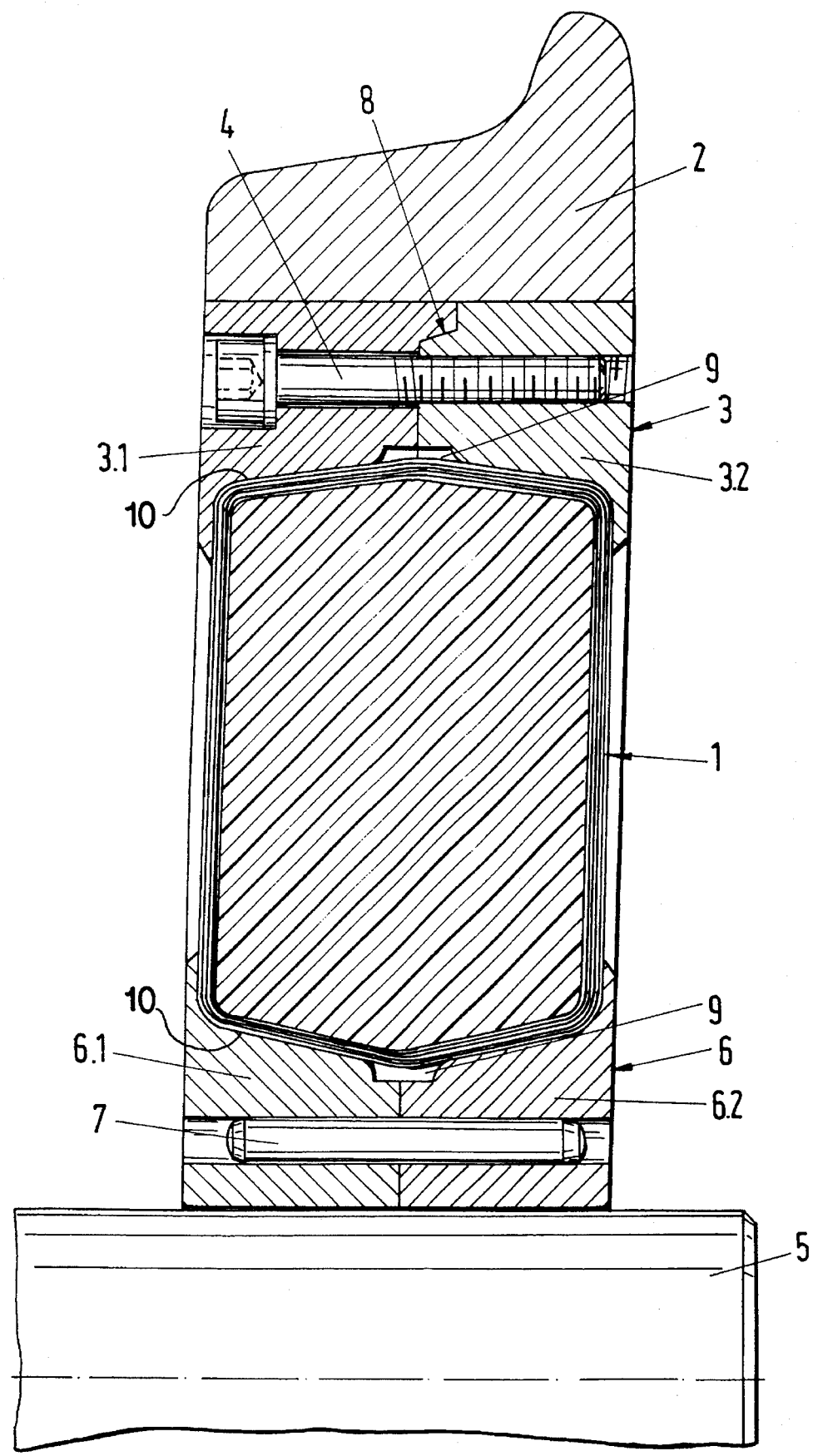

RAIL WHEEL

BACKGROUND AND SUMMARY OF THE INVENTION

The invention relates to a rail wheel having a wheel disk made of a plastic material and a tire made of metal. The two are connected with one another using a metallic intermediate ring onto which the tire is shrunk.

In the case of such a rail wheel, as for conventional rail vehicle wheels having an all-metal construction, it is naturally desirable to be able to exchange the tire after a certain amount of wear of its running tread and of the wheel flange. The use of the metallic intermediate ring provided for facilitating an exchange of the tire in the case of a rail wheel as is known from German Patent document DE-PS 31 43 845 has the advantage that the tire can be shrunk on in a conventional manner. However, the connection selected for this metallic intermediate ring with the wheel disk, by way of a radial ring extension embedded therein as the carrier of anchoring devices, apart from the expenditure of such a form-locking "embedding" connection, has the considerable disadvantage that the intermediate ring must be integrated during the manufacturing of the wheel disk, thus together with its shaping. As a result, for example, during the normally applied wet-winding of the wheel disk, an extremely precise positioning of the intermediate ring with respect to the wheel hub is required.

It is therefore an object of the present invention to eliminate the embedded connection between the wheel disk and the intermediate ring in the case of a rail wheel of the above-mentioned type while not reducing the safety of their connection when stressed by axial forces.

This object is achieved according to the present invention by a rail wheel having a wheel disk made of a plastic material and a tire made of metal. The two are connected with one another using a metallic intermediate ring onto which the tire is shrink. The wheel disk has a conical cross-sectional profile on its circumference. The intermediate ring, which is form-locking therewith, is axially divided into two partial rings. The two partial rings have corresponding partially conical interior surfaces which are in a mutual force-locking connection and are glued to the wheel disk.

It is an advantage of the present invention basically that the connection of the intermediate ring with the wheel disk no longer plays a role during its manufacturing. To the contrary, for the transmission of the axial forces from the intermediate ring to the wheel disk, two load paths are made available; that is, a double safety connection is ensured. Thus, the force can be transmitted by way of the glued, relatively large-surface connection between the intermediate ring or its partial rings and the wheel disk.

In this case, when shearing strains occur, the conical form of the interior surface of the intermediate ring will have compressive strains in the glue and therefore result in a significant increase of the stability under load of the glued connection to the wheel disk in the shearing direction. On the other hand, in the case of a failure of the glued connection, the transmission of the axial forces can take place by way of the form-locking conical surfaces of the intermediate ring and the wheel disk. With respect to this case, a further embodiment of the intermediate ring forming an axial mounting of the wheel disk on its hub will still increase the effectiveness of the load path.

Naturally, for obtaining the same effects in the two possible directions of the effect of the axial force, it is recommended that, if possible, a center division of the intermediate ring be selected, that is, a division in the wheel plane into two identical partial rings with a semiconical interior surface. As an alternative, depending on the demands on the rail wheel, instead of such a center division, an eccentric division is also conceivable, for example, a so-called side division of the intermediate ring.

Furthermore, according to a further embodiment of the invention, the wheel disk has a conical cross-sectional profile also on the hub side and is connected with a metal axle shaft by means of an additional intermediate ring. The additional intermediate ring is made of metal and is force-locked with the cross-sectional profile. The additional ring is divided into two additional partial rings of a partially conical outer surface which corresponds to the wheel disk hub. The additional partial rings are in a force-locking connection with one another and are glued to the wheel disk. The above-mentioned advantages of the double safety connection can also be utilized for the connection of the wheel disk with an axle shaft.

It is a further advantage of the present invention that the expenditure for the exact positioning of the respective intermediate ring on the wheel disk is relatively low. In this case, it is not important whether the wheel disk or its plastic structure is already hardened, is partially hardened, or is not yet hardened during the positioning of the intermediate ring. In the latter case, the unhardened plastic may expediently be used as the glue of the glued connection. In this case, the two partial rings bound a groove on their point of contact above a cone point of the wheel disk. This permits the accumulation of excess plastic material, i.e., glue and therefore also prevents a fold formation on the surface of the unhardened wheel disk when the partial rings are pushed on.

Finally, with respect to the force-locking connection of the two partial rings with one another, it should be noted that these partial rings when screwed together basically must only secure the cohesion of the partial rings during the exchange of the tire because otherwise the shrunk-on tire will ensure a sufficiently stressable force-locking mutual connection of the partial rings. This is particularly true in the case of a so-called glued shrinking during which the tire is additionally glued to the intermediate ring.

Other objects, advantages and novel features of the present invention will become apparent from the following detailed description of the invention when considered in conjunction with the accompanying drawings.

BRIEF DESCRIPTION OF THE DRAWINGS

The sole figure is a radial sectional view of half a rail wheel constructed in accordance with the present invention.

DETAILED DESCRIPTION OF THE DRAWINGS

The drawing is a radial sectional view of half a rail wheel in a construction comprising a tire and a wheel disk 1 made of a plastic material. This wheel disk 1 may, for example, similarly to the wheel disk of the rail wheel according to German Patent document DE-PS 38 14 343, have a core of foamed material with at least one outer fiber composite plastic cover layer. The connection between this wheel disk 1 and a tire 2 made of metal is established by way of a metallic intermediate ring 3, onto which the tire 2 is shrunk, preferably with the insertion of a glue layer 10 (for the above-discussed reasons).

In order to mount the intermediate ring 3 only after the construction of the wheel disk 1, and nevertheless be able to ensure a sufficiently safe connection when wheel loads occur, the wheel disk 1 has a conical cross-sectional profile on its circumference. The intermediate ring 3 form-locking with the conical cross-sectional profile, is axially divided into two identical partial rings 3.1, 3.2 with a correspondingly semiconical interior surface. In this case, the two partial rings 3.1, 3.2 are in a force-locking connection with one another because of the shrinking-on of the tire 2. During a tire change, this force-locking connection is ensured by a connection using screws 4 or other known equivalents. In addition, the two partial rings 3.1, 3.2 are glued to the wheel disk 1. Should this glued connection 10 fail as the so-called first load path, the axial force transmission from the intermediate ring 3 to the wheel disk 1 will take place by its form-locking conical surfaces. In this case, because of an overlapping of the faces of the wheel disk 1 by the partial rings 3.1, 3.2, the intermediate ring 3 additionally provides an axial mounting of the wheel disk 1 on its circumference.

As also illustrated in the drawing, the rail wheel is disposed on an axle shaft 5 made of metal, preferably by means of a shrinkage fit, which is why, corresponding to the above-described connection between the tire and the wheel disk, the connection between the wheel disk 1 and the axle shaft 5 is also established by way of an additional intermediate ring 6 made of metal. The wheel disk 1 therefore also has a conical cross-sectional profile on the hub side, and the additional intermediate ring 6 which is form-locking therewith is divided into two identical partial rings 6.1, 6.2 having a semiconical outer surface corresponding to the wheel disk hub. In this case, the two partial rings 6.1, 6.2 are force-lockingly connected with one another and are glued 10 to the wheel disk 1. Here also, an additional (not shown) glued connection may be provided between the axle shaft 5 and the additional intermediate ring 6 and, in addition, a connection (not shown) of the partial rings by means of screws in the case of a wheel change.

Finally, the drawing also illustrates possibilities with respect to a simple precise positioning of the partial rings 3.1, 3.2 and 6.1, 6.2 on the wheel disk 1, specifically by centering using either dowel pins 7 arranged in centering bores of the additional intermediate ring 6 or of its partial rings 6.1, 6.2 or by a centering form 8 of the abutting surfaces of the two partial rings 3.1, 3.2 of the first intermediate ring 3. Naturally, the illustrated centering for the respective intermediate ring 3 or 6 is not absolute. It may therefore be reversed or may be the same in the case of both intermediate rings 3 and 6. Furthermore, the design of the individual intermediate rings 3 and 6 is not limited to a circular ring shape. Therefore polygonal, trochoidal and other ring profiles are also conceivable if forces in the circumferential direction or moments acting in the shaft direction, must also be transmitted as a "fail-safe characteristic".

Finally, the groove 9 above the cone point of the wheel disk 1, which the two partial rings 3.1, 3.2 and 6.1, 6.2 of the intermediate rings 3 and 6 bound on their contact point, carries out the initially mentioned collecting function for excess wheel disk plastic if the partial rings are to be mounted on the still unhardened wheel disk 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A rail wheel, comprising:
    a wheel disk made of a plastic material;
    a tire made of metal;
    a metallic intermediate ring, said tire being shrunk onto said metallic intermediate ring which connects said wheel disk and said tire;
    wherein said wheel disk has an outer conical surface in cross-section, said metallic intermediate ring form-locking with said outer conical surface of said wheel disk;
    wherein said metallic intermediate ring is axially divided into two partial rings having corresponding partially conical interior surfaces which are in a mutual force-locking connection with, and glued to, said wheel disk.

2. A rail wheel according to claim 1, further comprising:
    an axle shaft made of metal on which said rail wheel is arranged;
    wherein a hub-side of said wheel disk has a conical cross-sectional profile and is connected with said axle shaft by way of an additional metallic intermediate ring;
    wherein said additional metallic intermediate ring is force-lockingly connected with the hub-side conical cross-sectional profile of the wheel disk, said additional metallic intermediate ring being divided into two additional partial rings having a partially conical outer surface corresponding to the hub-side wheel disk, said two additional partial rings being force-lockingly connected with one another, and glued to, said wheel disk.

3. A rail wheel according to claim 1, wherein the metallic intermediate ring forms an axial mounting of the wheel disk on its circumference.

4. A rail wheel according to claim 2, wherein the additional metallic intermediate ring forms an axial mounting of the wheel disk on its hub.

5. A rail wheel according to claim 1, wherein a screwed connection is provided for the partial rings.

6. A rail wheel according to claim 2, wherein a screwed connection is provided for the partial rings.

7. A rail wheel according to claim 2, wherein the two partial rings of the metallic intermediate ring and the additional metallic intermediate ring are centered.

8. A rail wheel according to claim 7, further comprising:
    dowel pins arranged in centering bores of the additional metallic intermediate ring or of its partial rings for performing a centering.

9. A rail wheel according to claim 7, wherein abutting surfaces of the two partial rings and the two additional partial rings include a centering shape.

10. A rail wheel according to claim 1, wherein the two partial rings bound a groove on their point of contact above a cone point of the wheel disk.

11. A rail wheel according to claim 2, wherein the two partial rings and the two additional partial rings bound a groove on their point of contact above a cone point of the wheel disk.

12. A rail wheel according to claim 9, wherein the two partial rings and the two additional partial rings bound a groove on their point of contact above a cone point of the wheel disk.

* * * * *